US012520746B2

(12) United States Patent
Gilbert et al.

(10) Patent No.: US 12,520,746 B2
(45) **Date of Patent: *Jan. 13, 2026**

(54) APPARATUS, SYSTEMS AND METHODS FOR APPLYING FLUID

(71) Applicant: Ag Leader Technology, Ames, IA (US)

(72) Inventors: Douglas Gilbert, Ames, IA (US); Ron Farrington, Nevada, IA (US); John Howard, Ames, IA (US)

(73) Assignee: Ag Leader Technology, Ames, IA (US)

(*) Notice: Subject to any disclaimer, the term of this patent is extended or adjusted under 35 U.S.C. 154(b) by 730 days.

This patent is subject to a terminal disclaimer.

(21) Appl. No.: 17/068,224

(22) Filed: Oct. 12, 2020

(65) Prior Publication Data

US 2021/0022286 A1 Jan. 28, 2021

Related U.S. Application Data

(63) Continuation of application No. 16/280,572, filed on Feb. 20, 2019, now Pat. No. 10,813,281.

(Continued)

(51) Int. Cl.

*A01C 23/00* (2006.01)
*A01C 15/00* (2006.01)

(Continued)

(52) U.S. Cl.

CPC .......... *A01C 23/007* (2013.01); *A01C 15/005* (2013.01); *A01M 7/0089* (2013.01);

(Continued)

(58) Field of Classification Search

CPC ........... A01C 7/04; A01C 7/06; A01C 15/005; A01C 23/007; A01M 7/0042;

(Continued)

(56) References Cited

U.S. PATENT DOCUMENTS 54,633 A 5/1866 Wilkinson
605,348 A 6/1898 Schultz (Continued)

FOREIGN PATENT DOCUMENTS

AU 2006203367 A1 2/2007
AU 2010201330 A1 3/2011

(Continued)

OTHER PUBLICATIONS

John Deere, "GreenStar 2 AutoTrac RowSense Quick Reference Guide", 2 pages.

(Continued)

*Primary Examiner* — Darren W Gorman
(74) *Attorney, Agent, or Firm* — DENTONS DAVIS BROWN PC; Matthew Warner-Blankenship; Kassandra Ricklefs

(57) ABSTRACT

The disclosed apparatus, systems and methods relate to fluid distribution systems. The fluid distribution systems being made up of a plurality of positive displacement pumps disposed on a fluid distribution manifold and proximate to the tank and the point of product discharge. The system optionally has a valve system for precision control of fluid discharge.

20 Claims, 13 Drawing Sheets

Related U.S. Application Data

(60) Provisional application No. 62/632,866, filed on Feb. 20, 2018, provisional application No. 62/632,836, filed on Feb. 20, 2018.

(51) Int. Cl.
*A01M 7/00* (2006.01)
*F04B 49/00* (2006.01)
*A01C 7/04* (2006.01)
*A01C 7/06* (2006.01)

(52) U.S. Cl.
CPC .................. *A01C 7/04* (2013.01); *A01C 7/06* (2013.01); *F04B 49/00* (2013.01)

(58) Field of Classification Search
CPC ..... A01M 7/0089; F04B 49/00; F04B 49/035; F04B 49/24; B05B 1/20; B05B 12/02
See application file for complete search history.

(56) References Cited

U.S. PATENT DOCUMENTS 1,178,765 A 4/1916 Waterman
1,252,923 A 1/1918 Moench
1,678,643 A 7/1928 Kassebeer
1,731,356 A 10/1929 Smith
2,357,760 A 9/1944 Peacock
2,525,435 A 10/1950 White
3,233,523 A 2/1966 Passaggio
3,718,191 A 2/1973 Williams
3,749,035 A 7/1973 Cayton
3,797,418 A 3/1974 Bridger
3,821,550 A 6/1974 Priest
3,844,357 A 10/1974 Ellinger
4,091,964 A 5/1978 Harrer
4,119,157 A 10/1978 Schuck
4,167,910 A 9/1979 Pretzer
4,193,458 A 3/1980 Long
4,209,109 A 6/1980 Curl
4,241,849 A 12/1980 Harrer
4,244,123 A 1/1981 Lazure et al.
4,329,911 A 5/1982 Schwerin
4,359,104 A 11/1982 Haapala
4,397,585 A 8/1983 Fouss
4,417,530 A 11/1983 Kopecky
4,596,200 A 6/1986 Gafford
4,603,645 A 8/1986 Wiemeyer
4,646,663 A 3/1987 Nikkel
4,655,296 A 4/1987 Bourgault
4,700,785 A 10/1987 Bartusek
4,720,929 A 1/1988 Umberson
4,736,534 A 4/1988 Daniels
4,784,524 A 11/1988 Stine
4,796,550 A 1/1989 Van Natta
4,865,132 A 9/1989 Moore
4,872,785 A 10/1989 Schrage et al.
4,878,443 A 11/1989 Gardner
4,913,070 A 4/1990 Morrison
4,920,680 A 5/1990 Lindgren
4,949,656 A 8/1990 Lyle
4,986,782 A 1/1991 Severtson
5,065,681 A 11/1991 Hadley
5,069,779 A 12/1991 Brown
5,074,227 A 12/1991 Schwitters
5,103,924 A 4/1992 Walker
5,139,751 A 8/1992 Mansfield
5,163,518 A 11/1992 Foley
5,170,909 A 12/1992 Lundle
5,234,060 A 8/1993 Carter
5,277,257 A 1/1994 Thompson
5,366,024 A 11/1994 Payne
5,427,182 A 6/1995 Winter
5,431,117 A 7/1995 Steffens et al.
5,479,992 A 1/1996 Bassett
5,497,837 A 3/1996 Kehrney
5,499,683 A 3/1996 Bassett
5,529,128 A 6/1996 Peterson
5,558,465 A 9/1996 Pecot
5,585,626 A 12/1996 Beck et al.
5,632,212 A 5/1997 Barry
5,664,507 A 9/1997 Bergland
5,709,271 A 1/1998 Bassett
5,789,741 A 8/1998 Kinter et al.
5,793,035 A 8/1998 Beck
5,829,535 A 11/1998 Line
5,842,428 A 12/1998 Stufflebeam et al.
5,862,764 A 1/1999 Umemoto
5,936,234 A 8/1999 Thomas
5,961,573 A 10/1999 Hale
5,978,723 A 11/1999 Hale et al.
6,003,455 A 12/1999 Flamme
6,013,020 A 1/2000 Meloul
6,016,713 A 1/2000 Hale
6,041,582 A 3/2000 Tiede et al.
6,068,063 A 5/2000 Mayerle
6,068,064 A 5/2000 Bettin
6,081,224 A 6/2000 Rosenbrock
6,091,997 A 7/2000 Flamme
6,116,172 A 9/2000 Prairie
6,119,837 A 9/2000 Tschurbanoff
6,193,440 B1 2/2001 Pidgeon
6,299,381 B1 10/2001 Liebrecht, Jr.
6,325,156 B1 12/2001 Barry
6,378,619 B2 4/2002 Mayerle
6,389,999 B1 5/2002 Duello
6,460,623 B1 10/2002 Knussman
6,681,706 B2 1/2004 Sauder et al.
6,701,857 B1 3/2004 Jensen
6,748,885 B2 6/2004 Sauder et al.
6,758,153 B1 7/2004 Hagen et al.
6,827,029 B1 12/2004 Wendte
6,863,006 B2 3/2005 Sandoval
7,081,611 B2 7/2006 Scott
7,131,384 B2 11/2006 Kester
7,263,937 B2 9/2007 Frasier
7,317,988 B2 1/2008 Johnson
7,331,436 B1 2/2008 Pack
7,334,532 B2 2/2008 Sauder et al.
7,395,767 B2 7/2008 Sulman
7,395,769 B2 * 7/2008 Jensen ................ A01C 21/005 701/50
7,478,603 B2 1/2009 Riewerts
7,540,246 B2 6/2009 Friesen
7,584,707 B2 9/2009 Sauder
7,673,570 B1 3/2010 Bassett
7,694,638 B1 * 4/2010 Riewerts ............. A01C 23/007 239/602
7,699,009 B2 4/2010 Sauder et al.
7,717,048 B2 5/2010 Peterson, Jr. et al.
7,870,826 B2 1/2011 Bourgault
7,938,074 B2 5/2011 Liu
7,980,186 B2 7/2011 Henry
8,020,657 B2 9/2011 Allard
8,056,465 B2 11/2011 Carlz
8,078,367 B2 12/2011 Sauder
8,234,988 B2 8/2012 Zielke
8,275,525 B2 9/2012 Kowalchuk
8,275,627 B2 9/2012 Henning
8,286,566 B2 10/2012 Schilling
8,307,771 B2 11/2012 Cannon
8,342,258 B2 1/2013 Ryder
8,346,442 B2 1/2013 Ryder
8,371,239 B2 2/2013 Rans et al.
8,418,636 B2 4/2013 Liu et al.
8,430,179 B2 4/2013 Van Buskirk
8,448,587 B2 5/2013 Kowalchuk
8,448,717 B2 5/2013 Adams et al.
8,451,449 B2 5/2013 Holland
8,479,671 B2 7/2013 Shoup
8,522,889 B2 9/2013 Adams et al.
8,544,397 B2 10/2013 Bassett
8,544,398 B2 10/2013 Bassett
8,550,020 B2 10/2013 Sauder et al.

(56) References Cited

U.S. PATENT DOCUMENTS 8,561,472 B2 10/2013 Sauder et al.
8,573,111 B2 11/2013 Graham
8,634,992 B2 1/2014 Sauder et al.
8,636,077 B2 1/2014 Bassett
8,755,049 B2 6/2014 Holland
8,763,713 B2 7/2014 Bassett
8,770,308 B2 7/2014 Bassett
8,776,702 B2 7/2014 Bassett
RE45,091 E 8/2014 Bassett
8,814,474 B2 8/2014 Bell
8,850,998 B2 10/2014 Garner
8,863,857 B2 10/2014 Bassett
8,875,641 B2 11/2014 Zielke
8,903,545 B2 12/2014 Riffel
8,909,436 B2 12/2014 Achen
8,910,582 B2 12/2014 Mariman et al.
8,924,092 B2 12/2014 Achen
8,924,102 B2 12/2014 Sauder et al.
RE45,412 E 3/2015 Sauder et al.
8,978,564 B2 3/2015 Hagny
8,985,037 B2 3/2015 Radtke
8,985,232 B2 3/2015 Bassett
9,055,712 B2 6/2015 Bassett
9,107,337 B2 8/2015 Bassett
9,107,338 B2 8/2015 Bassett
9,113,589 B2 8/2015 Bassett
9,119,342 B2 9/2015 Bonefas
9,137,938 B2 9/2015 Zimmerman
9,144,187 B2 9/2015 Bassett
9,144,189 B2 9/2015 Stoller
9,167,740 B2 10/2015 Bassett
9,173,339 B2 11/2015 Sauder et al.
9,192,089 B2 11/2015 Bassett
9,213,905 B2 12/2015 Lange
9,226,440 B2 1/2016 Bassett
9,232,687 B2 1/2016 Bassett
9,265,191 B2 2/2016 Sauder et al.
9,288,937 B2 3/2016 Sauder et al.
9,301,438 B2 4/2016 Sauder et al.
9,332,689 B2 5/2016 Baurer
9,338,937 B2 5/2016 Sauder et al.
9,351,440 B2 5/2016 Sauder et al.
9,417,120 B2 8/2016 Zielke
9,462,744 B2 10/2016 Isaacson
9,485,900 B2 11/2016 Connell
9,510,498 B2 12/2016 Tuttle et al.
9,523,496 B2 12/2016 Bingham
9,532,496 B2 1/2017 Sauder et al.
9,554,504 B2 1/2017 Houck
9,578,802 B2 2/2017 Radtke
9,585,301 B1 3/2017 Lund
9,629,304 B2 4/2017 Zielke
9,668,402 B2 6/2017 Hagny
9,675,004 B2 6/2017 Landphair
9,681,601 B2 6/2017 Bassett
9,693,496 B2 7/2017 Tevs
9,699,958 B2 7/2017 Koch
9,708,791 B2 7/2017 Strutynsky
9,723,778 B2 8/2017 Bassett
9,746,007 B1 8/2017 Stoller
9,750,174 B2 9/2017 Sauder
9,752,596 B2 9/2017 Sauder
9,788,472 B2 10/2017 Bassett
9,801,332 B2 10/2017 Landphair
9,814,172 B2 11/2017 Achen et al.
9,848,522 B2 12/2017 Bassett
9,848,523 B2 12/2017 Sauder
9,854,733 B1 1/2018 Kile
9,879,702 B2 1/2018 Stoller
9,955,623 B2 5/2018 Sauder et al.
9,968,033 B2 5/2018 Dunn
10,024,459 B1 7/2018 Friedlein
10,045,477 B2 8/2018 Hagny
10,064,322 B2 9/2018 Janelle
10,091,926 B2 10/2018 Maro
10,104,830 B2 10/2018 Heathcote
10,111,415 B2 10/2018 Kolb
10,143,128 B2 12/2018 Landphair et al.
10,231,376 B1 3/2019 Stanhope
10,257,973 B2 4/2019 Hubner
10,548,259 B2 2/2020 Heathcote
10,609,857 B2 4/2020 Sauder
10,645,865 B2 5/2020 Bassett
10,813,281 B2 10/2020 Gilbert
10,821,829 B2 11/2020 Foster
10,842,143 B2 11/2020 Humpal
10,959,369 B2 3/2021 Sieling
11,051,505 B2 7/2021 Humpal
11,144,775 B2 10/2021 Ferrari
11,197,411 B2 12/2021 Bassett
11,202,404 B2 12/2021 Walter
11,212,954 B2 1/2022 Maeder
11,277,961 B2 3/2022 Campbell
11,612,096 B2 3/2023 Sivinski
11,622,494 B2 4/2023 Arnett et al.
2002/0056407 A1 5/2002 Milne
2002/0073678 A1 6/2002 Lucand
2002/0170476 A1 11/2002 Bogner et al.
2003/0005867 A1 1/2003 Richard
2003/0116068 A1 6/2003 Sauder et al.
2003/0183141 A1 10/2003 Bergere et al.
2004/0139895 A1 7/2004 Thompson et al.
2005/0109870 A1 5/2005 Krise
2005/0155536 A1 7/2005 Wendte
2005/0172873 A1 8/2005 Mayerle
2005/0284350 A1 12/2005 Ptacek
2006/0071116 A1 4/2006 Quenneville
2006/0086295 A1 4/2006 Jensen
2007/0151492 A1 7/2007 Dillman
2007/0151824 A1 7/2007 Dillman
2008/0110382 A1 5/2008 Brockmeier
2008/0229986 A1 9/2008 Arksey
2008/0250993 A1 10/2008 Mariman et al.
2008/0257237 A1 10/2008 Friesen
2009/0056531 A1 3/2009 Jessen
2009/0056537 A1 3/2009 Jessen
2009/0112410 A1 4/2009 Shull
2010/0180808 A1 7/2010 Liu
2010/0192818 A1 8/2010 Gamer
2010/0270043 A1 10/2010 Ankenman
2010/0319941 A1 12/2010 Peterson
2011/0027479 A1 2/2011 Reineccius
2011/0184597 A1 7/2011 Thomas
2011/0313575 A1 12/2011 Kowalchuk
2012/0042813 A1 2/2012 Liu et al.
2012/0046838 A1 2/2012 Landphair et al.
2012/0048159 A1 3/2012 Adams et al.
2012/0048160 A1 3/2012 Adams
2012/0151910 A1 6/2012 Sauder
2012/0186503 A1 7/2012 Sauder
2012/0261149 A1 10/2012 Schmidt
2012/0291680 A1 11/2012 Rylander
2012/0328372 A1 12/2012 Hawkes
2013/0032363 A1 2/2013 Curry et al.
2013/0126430 A1 5/2013 Kenley
2013/0146700 A1 6/2013 Wigard
2013/0248212 A1 9/2013 Bassett
2013/0333601 A1 12/2013 Shivak
2014/0026748 A1 1/2014 Stoller
2014/0060869 A1 3/2014 Blunier
2014/0116735 A1 5/2014 Bassett
2014/0190712 A1 7/2014 Bassett
2014/0214284 A1 7/2014 Sauder et al.
2014/0216771 A1 8/2014 Bassett
2014/0238284 A1 8/2014 Kapphahn
2014/0262378 A1 9/2014 Connors
2014/0303854 A1 10/2014 Zielke
2014/0379230 A1 12/2014 Koch
2015/0028146 A1 1/2015 Tsukui
2015/0094916 A1 4/2015 Bauerer et al.
2015/0107501 A1 4/2015 Barton
2015/0176614 A1 6/2015 Stoller
2015/0195988 A1 7/2015 Radtke
2015/0264857 A1 9/2015 Achen

(56) References Cited

U.S. PATENT DOCUMENTS

2015/0271986 A1 10/2015 Sauder et al.
2015/0305229 A1 10/2015 Sauder
2015/0319919 A1 11/2015 Sauder
2016/0007521 A1 1/2016 Scherman
2016/0007524 A1 1/2016 Kusler et al.
2016/0040692 A1 2/2016 Stoller
2016/0128272 A1 5/2016 Sauder
2016/0143213 A1 5/2016 Kowalchuk
2016/0157412 A1 6/2016 Sauder
2016/0212932 A1 7/2016 Radtke
2016/0227700 A1 8/2016 Wendte
2016/0227701 A1 8/2016 Nelson
2016/0249525 A1 9/2016 Baurer et al.
2017/0000016 A1 1/2017 Prickel
2017/0013771 A1 1/2017 Townsend
2017/0049044 A1 2/2017 Stoller
2017/0086347 A1 3/2017 Sauder
2017/0094889 A1 4/2017 Garner
2017/0112043 A1 4/2017 Nair
2017/0217715 A1 8/2017 Scott
2017/0223947 A1 8/2017 Gall
2017/0280616 A1 10/2017 Gervais
2017/0354079 A1 12/2017 Foster
2017/0357029 A1 12/2017 Lakshmanan
2017/0359941 A1 12/2017 Czapka
2017/0367252 A1 12/2017 Sakaguchi
2018/0013270 A1 1/2018 Jubeck
2018/0015490 A1 1/2018 Grimm
2018/0024549 A1 1/2018 Hurd
2018/0092287 A1 4/2018 Garner
2018/0092288 A1 4/2018 Garner
2018/0092289 A1 4/2018 Wonderlich
2018/0092295 A1 4/2018 Sugumaran
2018/0125000 A1 5/2018 Levy
2018/0128933 A1 5/2018 Koch
2018/0132422 A1 5/2018 Hassanzadeh et al.
2018/0132423 A1 5/2018 Rowan
2018/0168094 A1 6/2018 Koch
2018/0199499 A1 7/2018 Adams
2018/0199505 A1 7/2018 Beaujot
2018/0206393 A1 7/2018 Stoller
2018/0210443 A1 7/2018 Matsuzaki
2018/0263174 A1 9/2018 Hodel
2018/0292339 A1 10/2018 Gunzenhauser
2018/0317380 A1 11/2018 Bassett
2018/0317381 A1 11/2018 Bassett
2018/0368310 A1 12/2018 Zimmerman
2018/0373264 A1 12/2018 Madsen
2019/0021211 A1 1/2019 Gutknecht
2019/0029165 A1 1/2019 Leimkuehler et al.
2019/0045703 A1 2/2019 Bassett
2019/0059206 A1 2/2019 Stanhope
2019/0072114 A1 3/2019 Myers et al.
2019/0075714 A1 3/2019 Koch
2019/0124824 A1 5/2019 Hubner et al.
2019/0162164 A1 5/2019 Funk
2019/0174666 A1 6/2019 Mantemach
2019/0191622 A1* 6/2019 Hafvenstein .......... B05B 13/005
2019/0232304 A1* 8/2019 Grimm ................ B05B 12/126
2019/0239413 A1 8/2019 DeGarmo
2019/0254223 A1 8/2019 Eichhorn et al.
2019/0286915 A1 9/2019 Patil
2019/0289778 A1 9/2019 Koch
2019/0297769 A1 10/2019 Zielke et al.
2019/0297774 A1 10/2019 Hamilton
2019/0302799 A1 10/2019 Schaff
2019/0373801 A1 12/2019 Schoeny
2019/0380259 A1 12/2019 Frank
2019/0387662 A1 12/2019 Viriat
2020/0029486 A1 1/2020 Buehler et al.
2020/0045869 A1 2/2020 Stanhope
2020/0053954 A1 2/2020 Hamilton
2020/0068778 A1 3/2020 Schoeny
2020/0068783 A1 3/2020 Strnad
2020/0080283 A1 3/2020 Shin
2020/0100418 A1 4/2020 Komecki
2020/0100419 A1 4/2020 Stanhope
2020/0100421 A1 4/2020 Wang
2020/0109954 A1 4/2020 Li
2020/0128723 A1 4/2020 Eichhorn
2020/0154627 A1 5/2020 Plattner
2020/0154629 A1 5/2020 Holoubek et al.
2020/0178455 A1 6/2020 Ishikawa
2020/0217044 A1 7/2020 Martel
2020/0221630 A1 7/2020 Pomedli
2020/0296882 A1 9/2020 Madison
2020/0305335 A1 10/2020 Schoeny
2020/0329631 A1 10/2020 Johnson
2020/0337218 A1 10/2020 Puhalla
2020/0352088 A1 11/2020 Arnett
2020/0359559 A1 11/2020 Koch
2020/0375081 A1 12/2020 Holoubek
2020/0375085 A1 12/2020 Strnad
2020/0375090 A1 12/2020 Morgan
2021/0022286 A1 1/2021 Gilbert et al.
2021/0051846 A1* 2/2021 Vandenbark .......... B05B 12/085
2021/0059102 A1 3/2021 Geistkemper
2021/0120726 A1 4/2021 Barrick
2021/0132618 A1 5/2021 Van Roekel
2021/0153421 A1 5/2021 Holoubek et al.
2021/0161060 A1 6/2021 Kaufmann
2021/0185903 A1 6/2021 Demiter et al.
2021/0235611 A1 8/2021 Fett
2021/0243939 A1 8/2021 Strnad
2021/0243941 A1 8/2021 Buehler
2021/0307236 A1 10/2021 Strnad
2021/0315147 A1 10/2021 Fanshier
2022/0000008 A1 1/2022 Hubner
2022/0061202 A1 3/2022 Holoubek et al.
2022/0061208 A1 3/2022 Campbell et al.
2022/0142039 A1 5/2022 Eichhorn et al.
2022/0151138 A1 5/2022 Barry
2022/0174855 A1 6/2022 Zielke et al.
2022/0232753 A1 7/2022 Van De Woestyne
2022/0272888 A1 9/2022 Hodel
2022/0369534 A1 11/2022 Nikolakakis
2023/0067038 A1 3/2023 Riemersma et al.
2023/0145955 A1 5/2023 Schmidt et al.
2023/0180653 A1 6/2023 Barry et al.
2023/0232733 A1 7/2023 Barry
2023/0388458 A1 11/2023 Eichhorn et al.
2023/0413720 A1 12/2023 Barry et al.
2024/0167848 A1 5/2024 Johnson
2024/0180066 A1 6/2024 Holoubek
2024/0268258 A1 8/2024 Eichhorn
2024/0334864 A1 10/2024 Holoubek et al.
2025/0133977 A1 5/2025 Barry et al.
2025/0348988 A1 11/2025 Eichhorn

FOREIGN PATENT DOCUMENTS

AU 2017382800 B2 6/2018
AU 2018100865 B4 6/2022
CA 2346724 A1 4/2000
CA 2549371 A1 11/2007
CA 2584736 A1 9/2008
CA 2727188 A1 12/2009
CN 108362267 8/2018
CN 112601450 4/2021
EP 372901 A2 6/1990
EP 606541 1/1997
EP 3219186 A1 9/2017
EP 2901838 B1 11/2017
EP 3698615 A1 8/2020
GB 18381 10/1904
GB 2309622 A 6/1997
JP 4517467 8/2010
KR 101728137 B1 4/2017
RU 2355152 5/2009
SU 948316 8/1982
SU 1148582 4/1985
WO 2009134144 A1 11/2009
WO 2014153157 A1 9/2014
WO 2015171908 A1 11/2015

(56) References Cited

FOREIGN PATENT DOCUMENTS

| | | | | |
|---|---|---|---|---|
| WO | 2017160860 A1 | 9/2017 | | |
| WO | 2017197274 A1 | 11/2017 | | |
| WO | 2017197292 | 11/2017 | | |
| WO | WO-2018151989 A1 * | 8/2018 | ........... | A01C 23/007 |
| WO | 2019164919 | 8/2019 | | |
| WO | 2021021594 | 2/2021 | | |
| WO | 2021231159 A1 | 11/2021 | | |

OTHER PUBLICATIONS

"The Precision Vacuum Planter Documentation and pictures", 3 pages.
Zimmerman Manufacturing LLC "Contour King St Gallery", 15 pages, 2021.
Zimmerman Manufacutring LLC "Countour King ST" Zimmerman Manufacturing Equipment, 7 pages 2021.
Precision Planting "FurrowForce" https://www.precisionplanting.com/products/product/furrowforce, 10 pages, 2021.
Kasper et al. "Relationship Between Six Years of Corn Yields and Terrain Attributes." 2003, Precision Agriculture vol. 4, pp. 87-101.
Orthman "1tRIPr Precision Tillage System" Brochure, 12 pages.
Deere "SeedStar XP Monitor for Planters" pp. 70-8-70-9, 2 pages.
ZML Contour King—YouTube Video—https://www.youtube.com/watch?v=T-rj_EZMC4, 2021.
Dawn Equipment—Twitter Video—https://twitter.com/DawnEquipment/status/969698839409111045, 2018.
8910 Floating Hitch Cultivator, available as early as 2010—https://www.bourgault.com/en-us/products/tillage/8910-cultivator.
Ground Breaker Precision Planters and Patented Tyne and Disc Row Units—https://www.precisionagsolutions.com.au/ground-breaker.
Janke Australia, available as early as 2017—https://www.janke.com.au/.
Modular Row Crop Planting Systems from Excel Agriculture, available as early as 2002—https://www.excelagr.com.au/excel-agri-row-crop-planter.php.
Parallelogram Tyne Units—https://bossagriculture.com.au/home/planter-row-units/parallelogram-tyne-units/.
Patriot Parallelogram Tyne Planter Farm Equipment Gessner, available as early as 2017—https://www.gessner.com.au/products/patriot-parallelogram-tyne-planter/.
Precision Planting FurrowJet, available as early as 2016.
Precision tyne planter takes innovation award , 2017, https://www.graincentral.com/machinery/precision-tyne-planter-takes-innovation-award.
What to Look for in a No Till or Minimum Tillage Planter—https://multifarmingsystems.com.au/wp-content/uploads/2015/07/What-to-Look-for-in-a-No-Till-or-Minimum-Tillage-Planter.pdf.
360 Yield Sensor—Wave—unknown, available as early as 2020.
Industrial Electronics Robust control of active suspensions for high performance vehicles, Proceedings of IEEE International Symposium on Industrial Electronics, 1996.
Industrial electronics, modeling and force tracking control of hydraulic actuator for an active suspension system, 2006 1st IEEE Conference on Industrial Electronics and Applications, 2006.
Gratton et al., Manitoba, Design of a spring-loaded downforce system for a no-till seed opener, 2003.
Zong-yi et al., Minesweeping Tank, Electrohydraulic System Using RBF Neural Network and Genetic Algorithm, 2010.
Enfield Technologies, EQV Proportional Pinch Valves, https://www.enfieldtech.com/Products/EQV-Proportional-Pinch-Valves.
Ditch Witch—https://www.ditchwitch.com/trenchers/quad/rt120-quad.
Soil Max—http://soilmax.com/.
Baumalight—https://baumalight.com/undertow/en/plows.php.
Liebrecht—http://farmdrainage.com/tile-plow/.
Oconnell—https://www.oconnelldrainage.com/.
Cray—http://www.crary.com/Products/Crary_Water_Solutions/Tile-PRO-Plow.
Johnson—http://www.johnsonplows.com/products/pull-typle-plows/—available as early as 2013.
French, Henry F. Farm drainage: the principles, processes, and effects of draining land with stones, wood, plows, and open ditches, and especially with tiles. New York: Orange Judd & Company, 1859.
John Deere—Row Crop Planter.
Kinze—row crop planter with interplant row units.
Kinze Manufacturing—Tru Count Row Unit.
John Deere—XP row unit.
John Deere—MaxEmerge2 row unit.
White 8000 Series Planter—Lift Wheels, Unknown—available as early as 2012, https://www.youtube.com/watch?v=tr1TPX5LRQA.
Great Plains—Twin-Row planter.
Kinze—Row Planter.
Great Plains Planter—Photos.
John Deere AG Management Solution, The payoff from precision, on farm network conference, Feb. 20, 2008, Scheman Building, Ames IA.
John Blue—John Blue Peristaltic Pump—http://www.cds-johnblue.com/pumps/ground-driven/squeeze-tube-pumps/squeeze-tube-pump.shtml.
Boss 18 Metre Parallelogram Tyne Planter—https://www.thecombineforum.com/threads/boss-18-metre-parallelogram-tyne-planter-on-9-spacing.222722/.
Uncooled LWIR Microbolometer Sensors—https://www.exosens.com/technologies/longwave-infrared-technology, 2025.
Laser Focus World—https://www.laserfocusworld.com/detectors-imaging/article/14177910/lwir-cameras-are-the-powerhouse-behind-thermal-imaging, 2020.
Li N, Zhao Y, Pan Q, Kong SG. Removal of reflections in LWIR image with polarization characteristics. Opt Express. Jun. 25, 2018;26(13):16488-16504. doi: 10.1364/OE.26.016488. PMID: 30119479.
5.2 Operating Manual for the Ag Leader Integra, Part No. 4002083, p. 130.

* cited by examiner

APPARATUS, SYSTEMS AND METHODS FOR APPLYING FLUID

CROSS-REFERENCE TO RELATED APPLICATION(S)

This application is a continuation of U.S. application Ser. No. 16/280,752, filed Feb. 20, 2019, issued Oct. 27, 2020 as U.S. Pat. No. 10,813,281, which claims priority to U.S. Provisional Application Nos. 62/632,866 and 62/632,836, both filed Feb. 20, 2018, each of which is hereby incorporated by reference in their entirety under 35 U.S.C. § 119(e).

TECHNICAL FIELD

The disclosed technology relates generally to a liquid application system, and in particular to a liquid application system using positive displacement pumps, various methods of calibration for the system and component configurations and associated devices to enhance flow control accuracy and extend range of flow control operation.

BACKGROUND

The disclosure relates to apparatus, systems and methods for the distribution of fluids via a distributed pump arrangement.

FIGS. 1A and 1B depict traditional prior art row liquid systems. In these prior systems, the tanks are located on or near the tractor. It is understood that by locating the tanks on a different vehicle/implement, the fluidic system requires a significant amount of plumbing to transport fluid within the system/between the pump and the rows. It is further understood that with such a fluidic system comes extra cost and chance for failure.

Additionally, these prior systems typically utilize a flow meter that is continually monitored and a product regulating valve that is continually adjusted to achieve a desired application rate. Prior art systems have utilized a throttling valve and/or flow meter on each row unit to control the application of flow to individual rows.

In the systems of FIGS. 1A and 1B, the systems utilize one main system pump which may cause the product flow rate and product pressure to drop or change at varying points along the toolbar, thereby creating an uneven distribution of fluid within the system.

There is a need in the art for improved fluid distribution systems, devices and methods.

BRIEF SUMMARY

Discussed herein are various devices, systems and methods relating to a liquid application system and associated methods and devices.

In Example 1, a row liquid distribution system for an agricultural implement, comprising a supply tank; a manifold in fluidic communication with the supply tank; a plurality of discharges; and a plurality of positive displacement pumps distributed along the manifold so as to be proximate to the plurality of discharges.

In Example 2, the system of Example 1, further comprising a high precision flow meter in fluidic communication with the supply tank.

In Example 3, the system of Example 1, wherein the system is constructed and arranged to utilize an electronic signature to establish volumetric flow via an open loop system.

In Example 4, the system of Example 1, further comprising: a second supply tank; a second manifold in fluidic communication with the second supply tank; a plurality of second discharges; and a plurality of second pumps distributed along the second manifold so as to be proximate to the plurality of second discharges.

In Example 5, the system of Example 4, wherein the plurality of pumps distributed along the manifold and plurality of second pumps distributed along the second manifold are variable speed positive displacement pumps.

In Example 6, the system of Example 1, further comprising a switching valve system constructed and arranged for intermittent application of fluid.

In Example 7, the system of Example 1, further comprising a calibration system.

In Example 8, a fluid distribution system for an agricultural implement, comprising: a tool bar; a manifold disposed along the tool bar; a plurality of pumps in fluidic communication with the manifold; and a plurality of discharges, each discharge in fluidic communication with a pump, wherein each pump is proximal to the discharge.

In Example 9, the system of Example 8, wherein the plurality of pumps are positive displacement pumps.

In Example 10, the system of Example 10, further comprising a switching valve system constructed and arranged for intermittent application of fluid.

In Example 11, the system of Example 11, wherein the valve system comprises: a plurality of valves, each valve in fluidic communication with a positive displacement pump and a recirculation circuit, wherein the recirculation circuit recirculates unused fluid back to the positive displacement pump.

In Example 12, the system of Example 11, wherein the plurality of valves are high speed two way valves.

In Example 13, the system of Example 11, wherein the plurality of valves are high speed three way valves.

In Example 14, the system of Example 9, further comprising a plurality of flow meters, wherein each flow meter is in fluidic communication with a positive displacement pump.

In Example 15, a fluid distribution system comprising: a supply tank; a manifold; a plurality of discharges, each discharge defining a row; a plurality of fluid control devices disposed along the manifold, each fluid control device proximal to a point of product discharge.

In Example 16, the system of Example 15, wherein the fluid control devices are selected from the group consisting of variable opening valves, variable restriction valves, positive displacement pumps and ball valves.

In Example 17, the system of Example 16, wherein positive displacement pump speed is adjustable based on ground speed, turning radius and application rate.

In Example 18, the system of Example 17, further comprising a flow meter in fluidic communication with each of the positive displacement pumps.

In Example 19, the system of Example 15, further comprising a valve system constructed and arranged for intermittent application of fluids.

In Example 20, the system of Example 19, wherein the valve system is modular.

Other embodiments of these Examples include corresponding computer systems, apparatus, and computer programs recorded on one or more computer storage devices, each constructed and arranged to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Implementations of the described techniques may include hardware, a method or process, or computer software on a computer-accessible medium.

While multiple implementations are disclosed, still other implementations of the disclosure will become apparent to those skilled in the art from the following detailed description, which shows and describes illustrative implementations of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

The various implementations disclosed or contemplated herein relate to fluid application systems and row liquid application technology. In certain implementations, an application system having multiple, distributed fluid control devices is provided. These fluid control devices may be positive displacement pumps and/or ball valves. In various implementations, each positive displacement pump is driven by a motor to precisely meter liquid flow rate to multiple discharge points across the width of an agricultural toolbar. In certain implementations, the speed of the pump is varied to turn product dispense on/off as well as control the application rate. The contemplated systems allow for individual control of each discharge point across an agricultural toolbar.

Figure 1A:
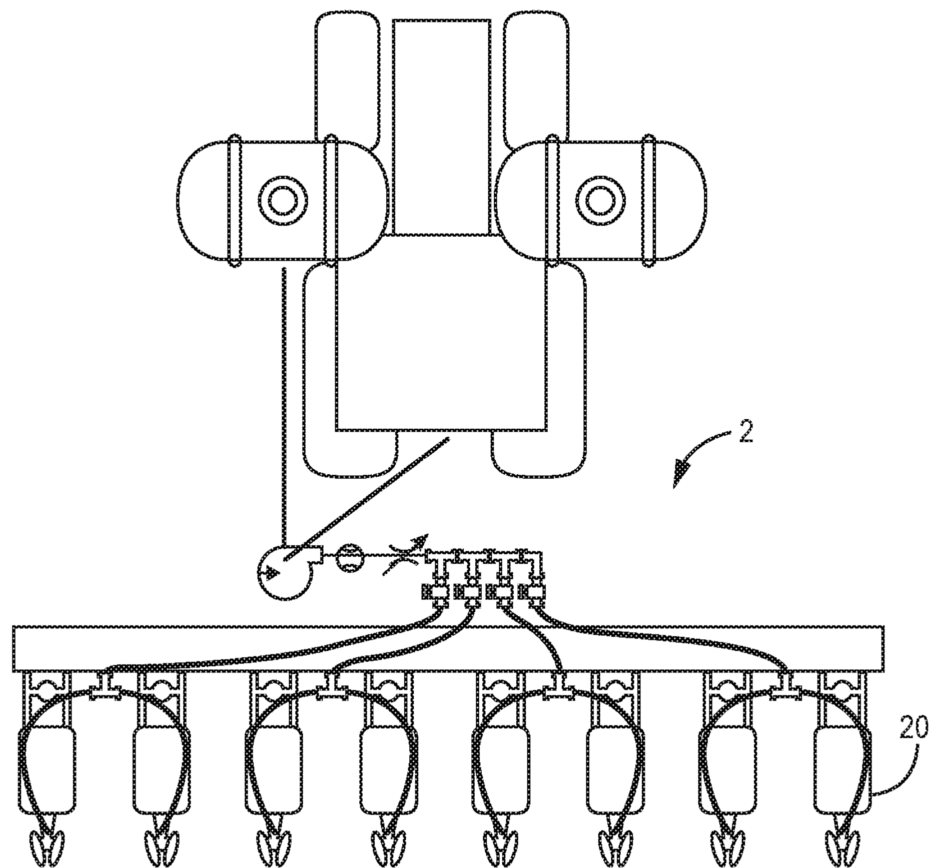
FIG. 1A is a top view of a prior art tool bar liquid system.
Figure 1B:
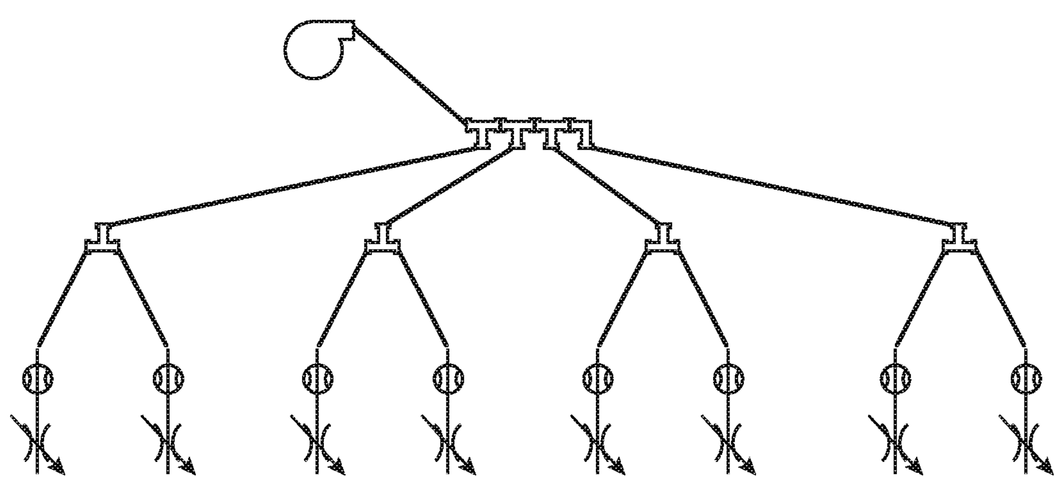
FIG. 1B is a top schematic view of a prior art row liquid system.
Figure 2:
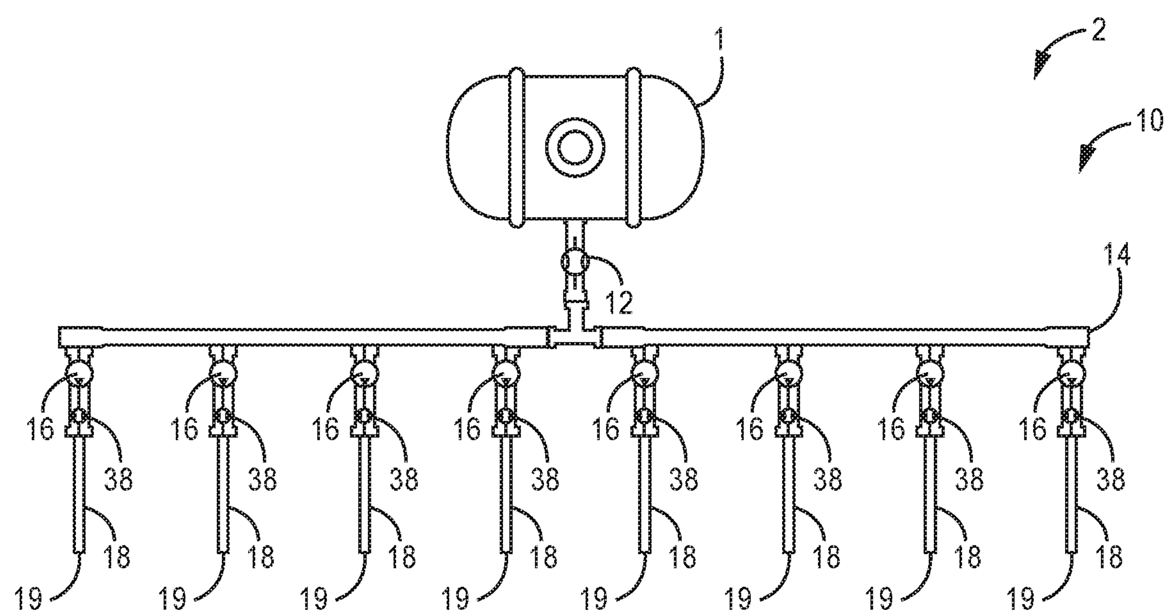
FIG. 2 is a top view of a fluid control system, according to one implementation.

One exemplary application system 10 utilizing distributed positive displacement pumps 16 and several optional components is shown in the implementation of FIG. 2. In these implementations, the system 10 has a supply tank 1 in fluidic communication with a flow meter 12 such as a high precision flow meter 12 that is in further fluidic communication with a fluid distribution manifold 14. The manifold 14 is in fluidic communication with a plurality of pumps 16 distributed across the manifold 14 as applicable for the individual implementation. For example, in certain implementations, the pumps 16 are distributed so as to be in proximate fluidic communication with individual rows and/or row units. In various implementations, the pumps 16 are variable speed positive displacement pumps 16. Various pump 16 configurations are discussed herein in relation to FIGS. 5-8 and FIGS. 14-16.

Figure 3:
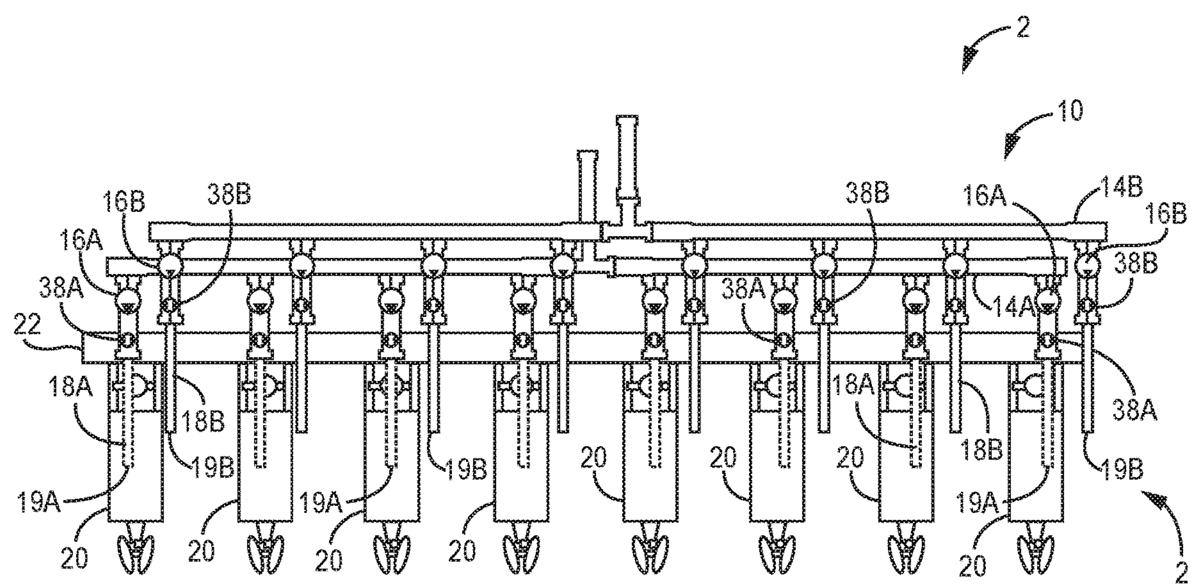
FIG. 3 is a top view of a fluid control system, according to one implementation.
Figure 4:
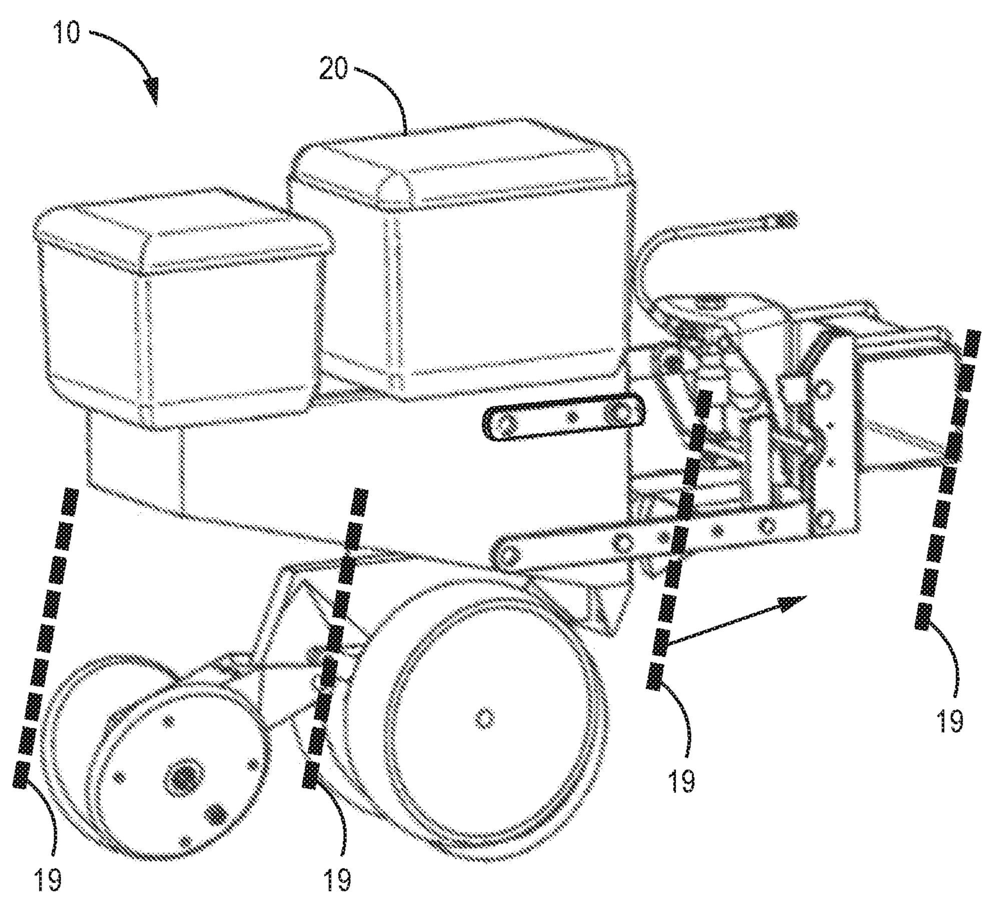
FIG. 4 is a perspective view of a row unit showing several possible discharge points, according to certain implementations.

In various implementations, the manifold 14 extends along the length of an agricultural tool bar (shown for example in FIG. 3 at 22). In certain of these implementations, positive displacement pumps 16 are disposed along the manifold 14 at various locations, such as at the connection between the toolbar 22 and each individual row unit 20 attached to the toolbar 22, other locations are possible as would be understood by those of skill in the art.

Continuing with the implementation of FIG. 2 and as also shown in the implementation of FIG. 3, the distributed pumps 16 are in turn in fluidic communication with discharges 18 constructed and arranged to apply the liquid to the field at the point of product discharge 19, as would be understood by those of skill in the art. In various implementations, any combination of liquid pesticides, fungicides, insecticides, inoculants or crop nutrients can be metered and applied. It is understood that the system 10 allows for controlled and precise application of fluids at all points along the toolbar and throughout the fluidic system.

In some implementations the supply tank 1 is mounted on the implement 2. Mounting of the supply tank 1 on the implement 2, eliminates the additional fluidic system that would have been needed in order to pump a product from a supply tank 1 mounted to a tractor or other vehicle. Simplifying and reducing the amount of fluidic system required reduces the cost of the system 10 and improves reliability.

Various implementations of the system 10 are constructed and arranged to establish the volumetric flow rate for use in regulating the discharge of fluid. In certain implementations, the pumps 16 are optionally in fluidic communication with flow meters 38, as is shown in FIGS. 2 and 3 and elsewhere. Flow meters 38 may be disposed distally from the supply tank 1 between the pump 16 and the discharge 18. These optional flow meters 38 may help to precisely regulate the amount of flow.

In alternate implementations, the system 10 is constructed and arranged to establish volumetric flow without a flow meter. Instead, the system 10 is constructed and arranged to utilize an electronic signature to establish volumetric flow.

That is, in these implementations, the system 10 can be configured such that one or more pump characteristics are known or determined, some non-limiting examples of such features being current applied to the pump motor, voltage applied to the pump motor; pump characteristics such as displacement and/or volumetric efficiency/leakage; the viscosity/fluid characteristics of the applied fluid, the motor characteristics and/or pump rotational speed. As such in various implementations, the system utilizes, for example, the current applied to the plurality of pumps, voltage applied to the plurality of pumps, displacement of the plurality of pumps, volumetric efficiency of the plurality of pumps, viscosity of an applied liquid and/or pump rotational speed as an electronic signature.

It is understood that the system 10 can be configured, such as via on-board software, to be able to utilize one or more of the pump and/or fluid characteristics so as to accurately estimate the volumetric flow of the fluid. That is, for example, the system 10 can calculate or otherwise estimate the volumetric flow on the basis of user inputted information on the type of fluid when electronic signature information such as voltage and/or current or the pump rotational speed are established via the system software, which has been calibrated with information about the pump and/or fluid. In use according to this example, the end user may indicate to the system that a specific pesticide is being used, and the system 10 is configured to utilize an open-loop system on the basis of the known fluidic characteristics of that pesticide, coupled with the applied current and voltage to establish volumetric flow. Many other examples are of course possible for other implementations.

FIG. 3 depicts another implementation of the system 10 where multiple products are being applied via manifolds 14A and 14B. For example, one product may be placed in a seed furrow and the second product applied adjacent to a seed furrow. In some of these implementations, the system 10 consists of two distribution manifolds 14A, 14B. The manifolds 14A, 14B are in fluidic communication with displacement pumps 16A, 16B. The positive displacement pumps 16A, 16B are in turn in fluidic communication with discharges 18A, 18B. In alternate implementations, the positive displacement pumps 16A, 16B are in fluidic communication with flow meters 38A, 38B, which are in fluidic communication with discharges 18A, 18B.

In certain implementations, the system 10 can be used in conjunction with an implement such as a row crop planter 2. The row crop planter 2 according to these implementations comprises a plurality of row units 20 disposed on a toolbar 22. The distribution manifold 14A may distribute various fluids to the individual row units 20 via the discharges 18A, 18B. Those of skill in the art will appreciate that in these implementations, the positive displacement pump(s) 16A, 16B are in close proximity to row unit 20 and/or point of product discharge 19A, 19B.

Figure 10:
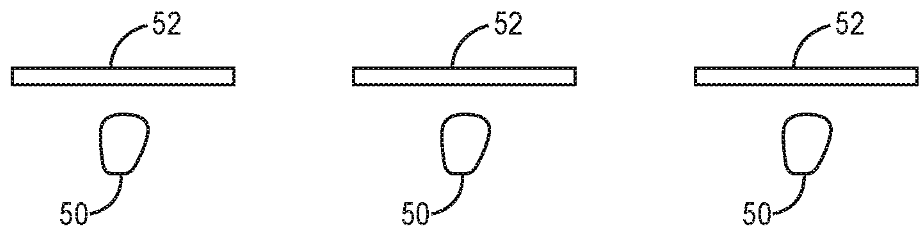
FIG. 10 is a top view of application of fluid next to seed, according to one implementation.
Figure 12:
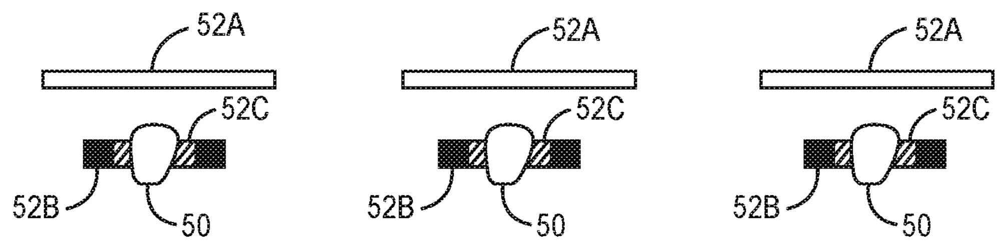
FIG. 12 is a top view of the application of a plurality of fluid to seed, according to one implementation.
Figure 13:
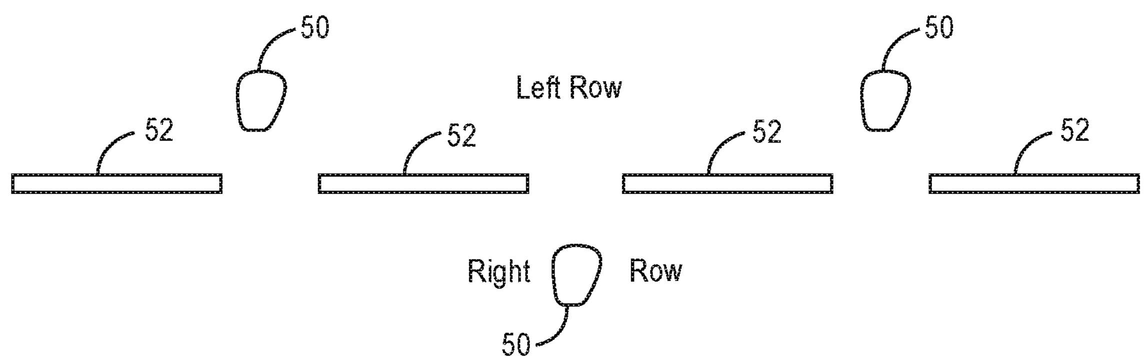
FIG. 13 is a top view of the application of fluid intermediate to rows, according to one implementation.
Figure 14:
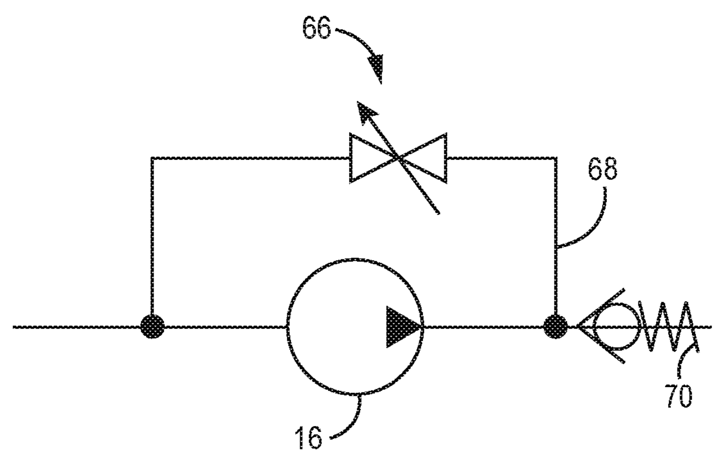
FIG. 14 is a schematic of a positive displacement pump system, according to one implementation.

Various other implementations are possible including use with a side dress fertilizer bar shown further in FIGS. 10, 12 and 13.

Use of positive displacement pumps 16A, 16B close to the discharge 18A, 18B and point of product discharge 19A, 19B allows for product flow rate and pressure to be applied in a controlled manner at each discharge point 19, 19A, 19B to be uniform or otherwise controlled across the width of the toolbar 22, so as to eliminate undesirable variations in discharge rate amongst the various discharges 18A, 18B. It is understood that flow rates within each discharge 18A, 18B and at the point of product discharge 19A, 19B can be the same when that is what is desired. Pressure in the manifold 14, 14A, 14B—or whatever fluidic system is used—would necessarily be different in different locations because of pressure drops along the pipes, but the flow out of the pumps could be the same. Controlled distribution of product pressure across the toolbar 22 is achieved by having a known flow to speed command correlation.

In various implementations, the use of positive displacement pumps 16A, 16B allows for controlled variation in product application rates across the width of the toolbar 22. Different rates for product application can be chosen based on sensor feedback, georeferenced map input, and/or other variables known to those of skill in the art. Additionally, product flow can be varied on a row by row basis to compensate for proper application when driving contoured rows. In implementations with optional flow meters 38, 38A, 38B, the flow meters 38, 38A, 38B may be utilized as part of a closed loop system providing feedback to the system 10. Flow meters 38, 38A, 38B may also be utilized for monitoring and diagnostics.

The system 10 may be retrofitted onto an existing toolbar 22, with or without a prior fluid distribution system. The system 10 reduces the number of parts needed for precise control of fluid at a multitude of points at varying distances from the supply. By reducing the number of parts needed the system 10 is less expensive and has a lower chance of failure.

As shown in FIGS. 5-8, in various implementations the system 10 comprises an optional switching valve system 40. It will be appreciated by the skilled artisan that use of a switching valve 30 according to these implementations permits the intermittent, targeted application of fluid while the system traverses a field, which allows for reduction in the amount of product used while maintaining the same level of effectiveness of the product. The switching valve system 40, can be utilized to strategically, precisely place fluids relative to the seed such that less fluid is used during application. It is further appreciated that this timed application via the switching valve 30 can be timed via interaction with a seed sensor or other timing mechanism understood in the art.

Figure 5:
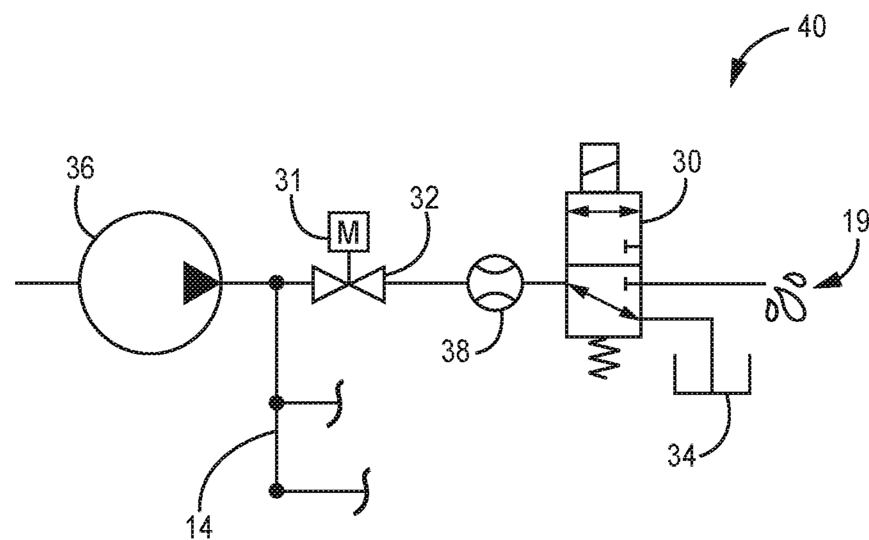
FIG. 5 is a schematic drawing of a switching valve system, according to one implementation.

A switching valve system 40 without the use of a positive displacement pump is shown in the implementation of FIG. 5. The switching valve system 40 according to these implementations has a main system pump 36, which in some implementations has provisions for bypassing unused flow. The main system pump 36 is in fluidic communication with the manifold 14 so as to be capable of pumping fluid/product to the individual rows, as described above.

In these and other implementations, the switching valve system 40 may have a variable opening valve 32, such as a ball valve 32, or other variable opening valve 32 for average flow control on a row. The variable opening valve 32 may be electronically actuated via a closed-loop control system and a motor actuator 31. The main system pump 36 is in fluidic communication with the variable opening valve 32. The variable opening valve 32 is in fluidic communication with a flow meter 38 which is used for control and diagnostics, as described below. The flow meter 38, according to these implementations, is in fluidic communication with a switching valve 30. The switching valve 30 may be a high speed, three way valve 30, or a high speed two way valve 30, while other types of valves are contemplated. The switching valve 30 is in fluidic communication with the point of product discharge 19. The switching valve 30 may also be in fluidic communication with conduits, manifolds, lines and other components of a fluidic system 34 for returning unused fluid/product to the tank (not pictured). It is appreciated that the components of the system may be repeated for each row.

Figure 6:
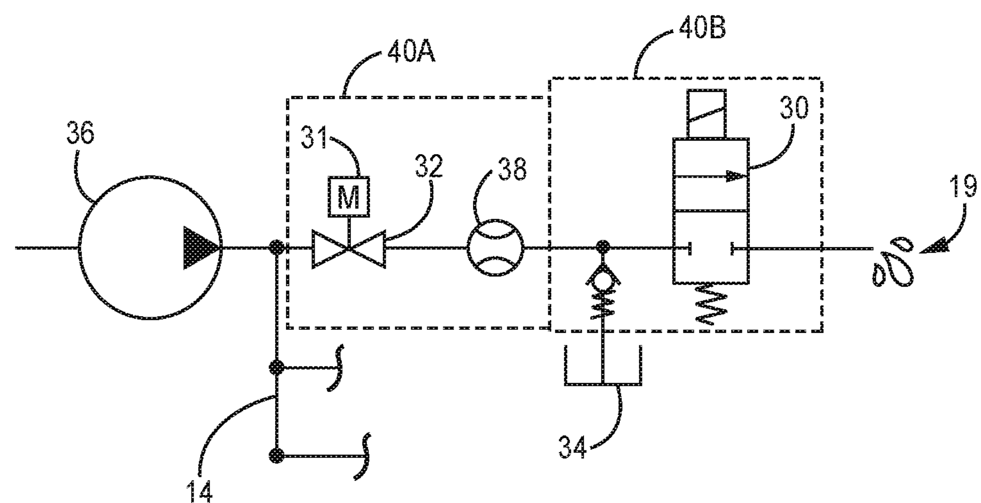
FIG. 6 is a schematic drawing of a switching valve system, according to one implementation.

FIG. 6 depicts an alternate implementation of the switching valve system 40. The switching valve system 40 according to these implementations may be modular, so as to have a modular component 40A and another modular component 40B or more, each of these components 40A, 40B being configured so as to be operably coupleable with one another. In various implementations the main system pump 36 is in the fluidic communication with each row and a variable opening valve 32 on each row.

In these implementations, the variable opening valve 32 is in fluidic communication with a flow meter 38. The variable opening valve 32 according to certain implementations may be electronically actuated with a motor actuator 31 and a closed-control system. The variable opening valve 32, motor actuator 31, and flow meter 38 make up one modular component 40A. The flow meter is in fluidic communication with a second modular component 40B comprising a fluidic system 34 for recirculating unused fluid.

The unused fluid may be recirculated in a plurality of fashions as would be appreciated. The flow meter is in fluidic communication with a switching valve 30. The switching valve 30 may be a high speed, two way valve 30 or high speed, three way valve 30, however it is readily appreciated by one of skill in the art that other valve types are contemplated. The switching valve 30 provides a "pulse" type functionality allowing for an on/off application of fluid. The switching valve 30 is in fluidic communication with the point of product discharge 19.

Figure 7:
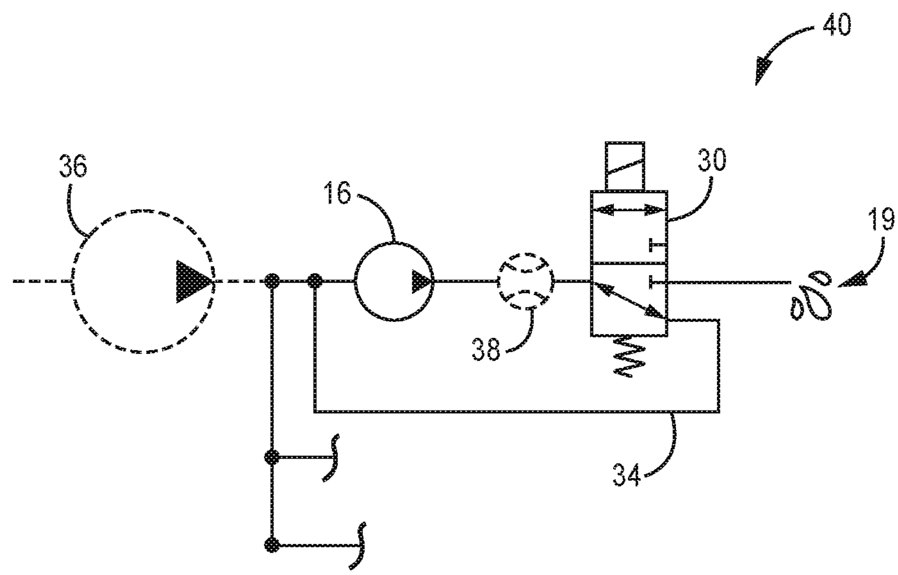
FIG. 7 is a schematic drawing of a switching valve system with positive displacement pump, according to one implementation.

FIG. 7 depicts an alternative implementation of the switching valve system 40. In various implementations the system pump 36 is optional. The system pump 36 and/or tank (not pictured) is in fluidic communication with the switching valve system 40 of each row. The system pump 36 or tank is in fluidic communication with a positive displacement pump 16. The positive displacement pump 16 is in fluidic communication with an optional flow meter 38. In some implementations the flow meter 38 is optional. In implementations without the flow meter 38 the positive displacement pump 16 is in fluidic communication with a switching valve 30. In implementations with a flow meter 38, the flow meter 38 is in fluidic communication with the switching valve 30. The switch valve 30 is in fluidic communication with the point of product discharge 19. The switch valve 30 is also in fluidic communication with a fluidic system 34 for recirculating of unused fluid.

Figure 8:
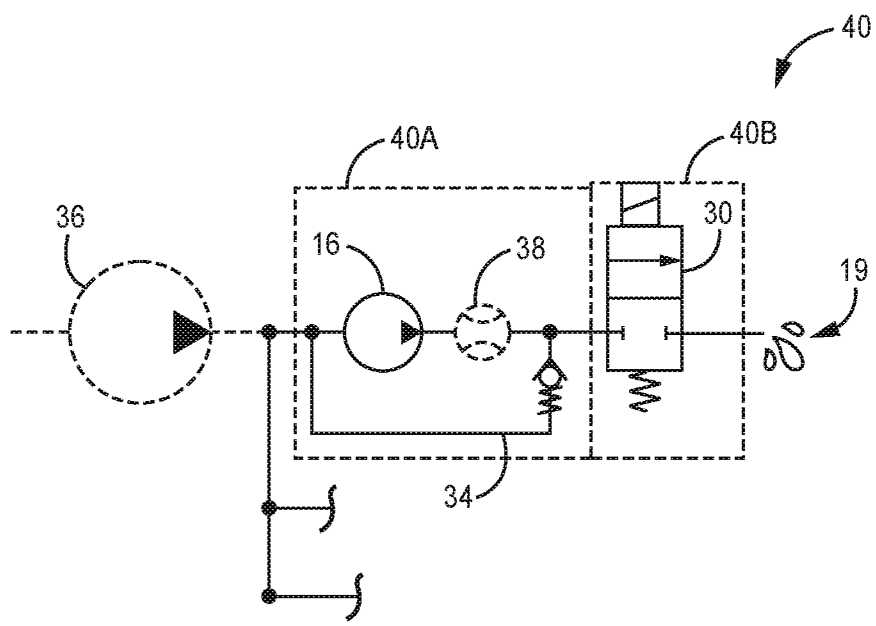
FIG. 8 is a schematic drawing of a switching valve system with positive displacement pump, according to one implementation.

FIG. 8 depicts another implementation of the switching valve system 40. The switching valve system 40 may be modular and consist of at least two modules 40A, 40B. In various implementations, the switching valve system 40 has an optional system pump 36. The switching valve system 40 has a positive displacement pump 16 in fluidic communication with an optional flow meter 38. The positive displacement pump 16 and optional flow meter 38 are in fluidic communication with a pulse valve 30. In some implementations, there are fluidic system 34 components routed from after the positive displacement pump 16 to just before the positive displacement pump 16 for recirculation of unused fluid. The switching valve 30 is in fluidic communication with the point of fluid/product discharge 19.

Shown in FIGS. 9-12 are exemplary implementations of how the switching valve system 40 may be used to strategically and precisely place fluids relative to seed.

Figure 9:
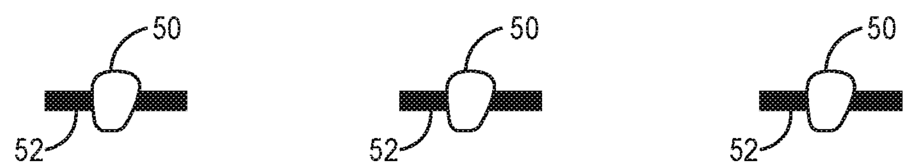
FIG. 9 is a top view of application of fluid to seed, according to one implementation.

Turning to the implementation of FIG. 9, the fluid 52—such as fertilizer—is discharged just before planting of seed 52 and discharge is stopped just after the seed 52. This start-and-stop type placement of fluid 52 allows for the fluid 52 to be placed on and around the seed without wasting fluid 52 on parts of the field that are not in need of the fluid 52.

FIG. 10 depicts an implementation of the system 10 configured for use of the switching pump system 40 with side-dress fluid placement. The system 10 and switching pump system 40 may be configured such that a desired fluid 52—such as nutrient mixtures—can be placed adjacent to the seed 50. It is understood that a desirable aspect of these implementations is that it is possible to apply fluid 52 intermittently, such that the fluid 52 is not placed in the area or space between seeds 50 where the fluid 52 is not needed. This type of controlled placement of fluid 52 conserves fluid 52, thereby reducing both cost and environmental impact.

Figure 11:
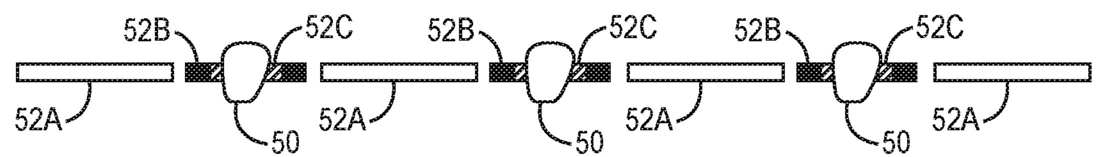
FIG. 11 is a top view of the application of a plurality of fluid to seed, according to one implementation.

The switching pump system 40 used in conjunction with the system 10 or other known systems allows for controlled placement of a variety of fluids 52, 52A, 52B, 52C simultaneously. By way of example, FIG. 11 shows the placement of different fluids 52A, 52B, 52C, such as insecticide/fungicide 52C, fertilizer 52B, side-dress nutrients 52A, while other fluids/products may be used, as would be known to those of skill in the art.

In some implementations the side dress nutrient 52A is placed in-between seeds 50 such that it does not overlap the placement of other fluids 52B and 52C. Fluids such as insecticide/fungicide 52C and fertilizer 52B can be applied in the same area as the seed 50. If more or less insecticide or other fluid 52C is desired it can be discharged such that it covers only the area desired.

FIG. 12 shows fluids 52A, 52B, and 52C being applied around seeds 50 according to another possible configuration. The one fluid 52A may be placed adjacent to the seed 50, rather than in-line with and/or in-between seeds.

The switching valve system 40 and system 10 can also discharge fluid 52 as shown in the implementation of FIG. 13. The fluid 52 may be discharged in such a way as to be intermediate of two rows.

The system 10 and use with the optional switching valve system 40 creates stable and precise rates of control of fluid 52 application. In some implementations unused fluid 52 may be recirculated to reduce waste. The speed of the positive displacement pump(s) 16 can be adjusted based on ground speed. In various other implementations the switching pump system 40 is not present and fluids 52 are applied continuously by the system 10.

The range of flow rates at which a positive displacement pump 16 is accurate can be increased by addition of a bypass line 68 with a restriction 66 or valve 66 of a size for the low end of the flow range of the pump 16. Shown in FIG. 14, the bypass line 68 directs fluid around the positive displacement pump 16. The bypass line 68 is in fluidic communication with a controllable restriction 66 or other valve 66. The controllable restriction 66 may be electronically actuated. Output flow can be reduced below the minimum flow of the pump 16 by opening the restriction/valve 66 to direct some of the output flow back to the pump 16 inlet. The positive displacement pump 16 outlet may have a load 70 to assure the discharge pressure is sufficiently higher than the inlet pressure to cause the fluid in the bypass 68 to flow in the proper direction. In various implementations, the load 70 may be a restriction or a spring loaded check valve.

Figure 15:
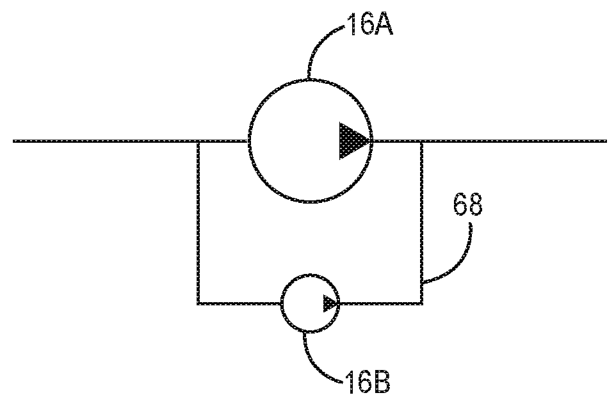
FIG. 15 is a schematic of a positive displacement pump system, according to one implementation.
Figure 16:
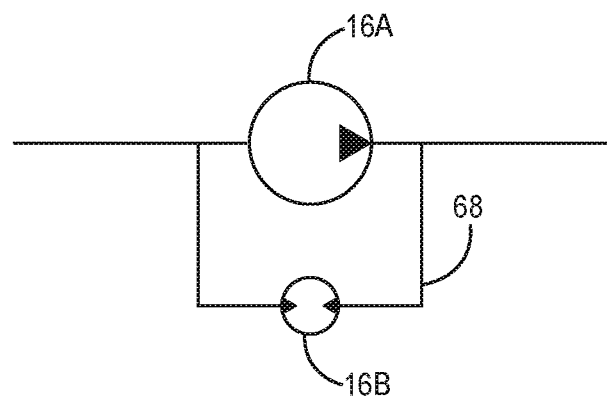
FIG. 16 is a schematic of a positive displacement pump system, according to one implementation.

Flow range can also be extended with the addition of a second smaller positive displacement pump 16B into the system 10, as shown in FIGS. 15 and 16. The smaller positive displacement pump 16B can be single, bi-directional or other pump type known to those of skill in the art.

FIG. 15 depicts a an implementation of the system 10 wherein a positive displacement pump 16A and a second smaller positive displacement pump 16B are in fluidic communication via a bypass line 68. In some implementations, the second positive displacement pump 16B running at its minimum output should meet or be lower than the lowest flow requirements of the system 10. The maximum output of the second positive displacement pump 16B should be greater than or approximately equal to the minimum flow of the first positive displacement pump 16A. Some amount of overlap of the flow rate ranges is desirable. The sum of the maximum output of the first positive displacement pump 16A and second positive displacement pump 16B should be equal to or greater than the maximum flow requirements of the system 10.

In some implementations, the smaller pump 16B is run when the flow requirements are low. If the flow requirement exceeds the maximum output of the smaller pump 16B, the small pump 16B may be shut off and the larger pump 16A used. If the flow requirements exceed the maximum output of the large pump 16A, the large pump 16A and small pump 16B can be used together to increase the flow capacity of the system 10.

In another implementation shown in FIG. 16, the small pump 16B is a bi-directional positive displacement pump 16B. In these implementations, when system 10 flow requirements are low the small pump 16B can be run in the forward direction. According to these implementations, when the system 10 flow requirements exceed the maximum flow of the small pump 16B the large pump 16A can be run at a minimum output while the small pump 16B can be run in reverse, subtracting some flow from the large pump 16A. If the flow requirements exceed the minimum output of the large pump 16A the small pump 16B can be shut off and the large pump 16A run alone. If the flow requirements of the system 10 exceed the maximum output of the large pump 16A the small pump 16B can also be run in the forward direction to increase flow capacity of the system 10.

Figure 17:
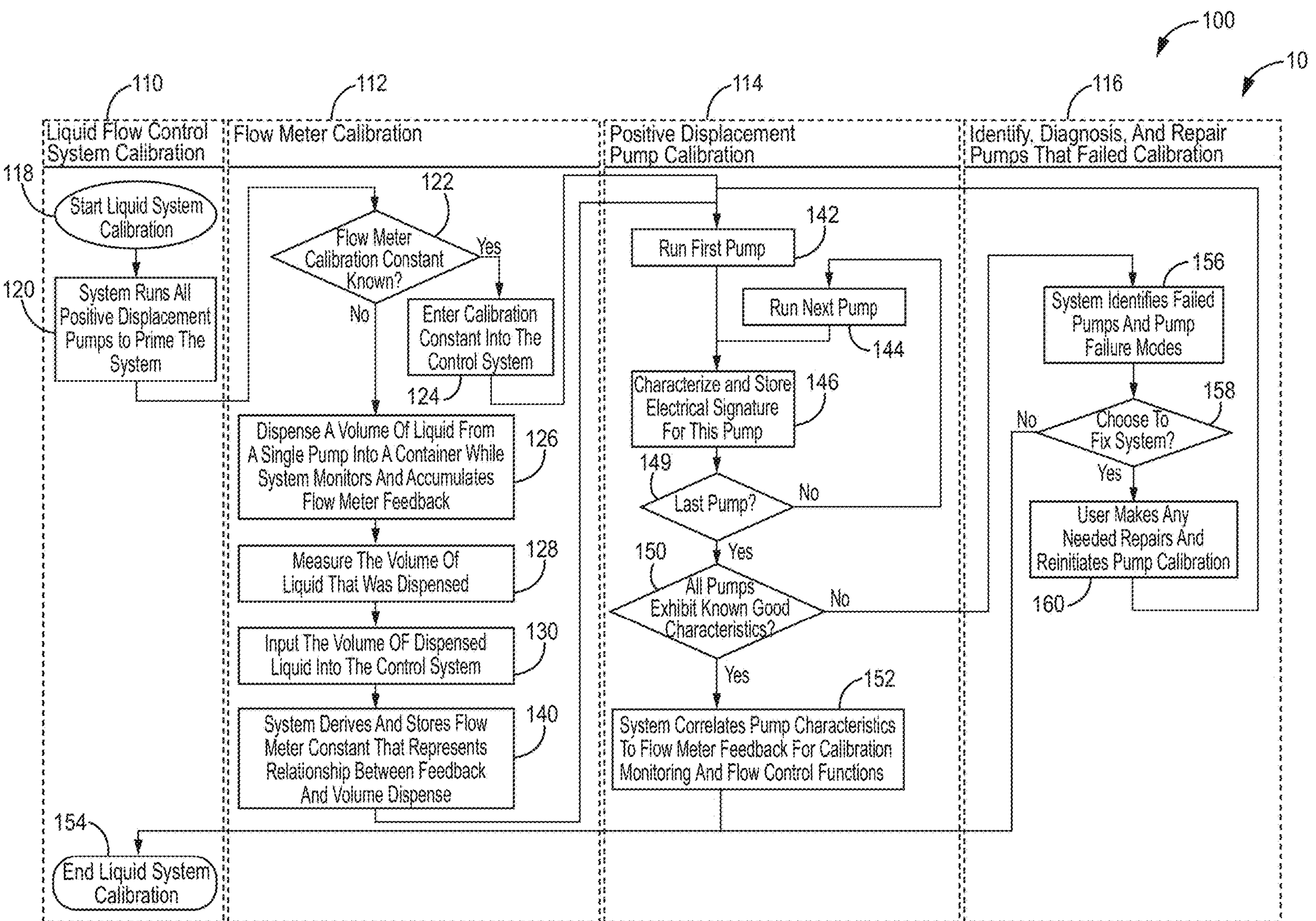
FIG. 17 is a flow chart showing the calibration system, according to one implementation.
Figure 18:
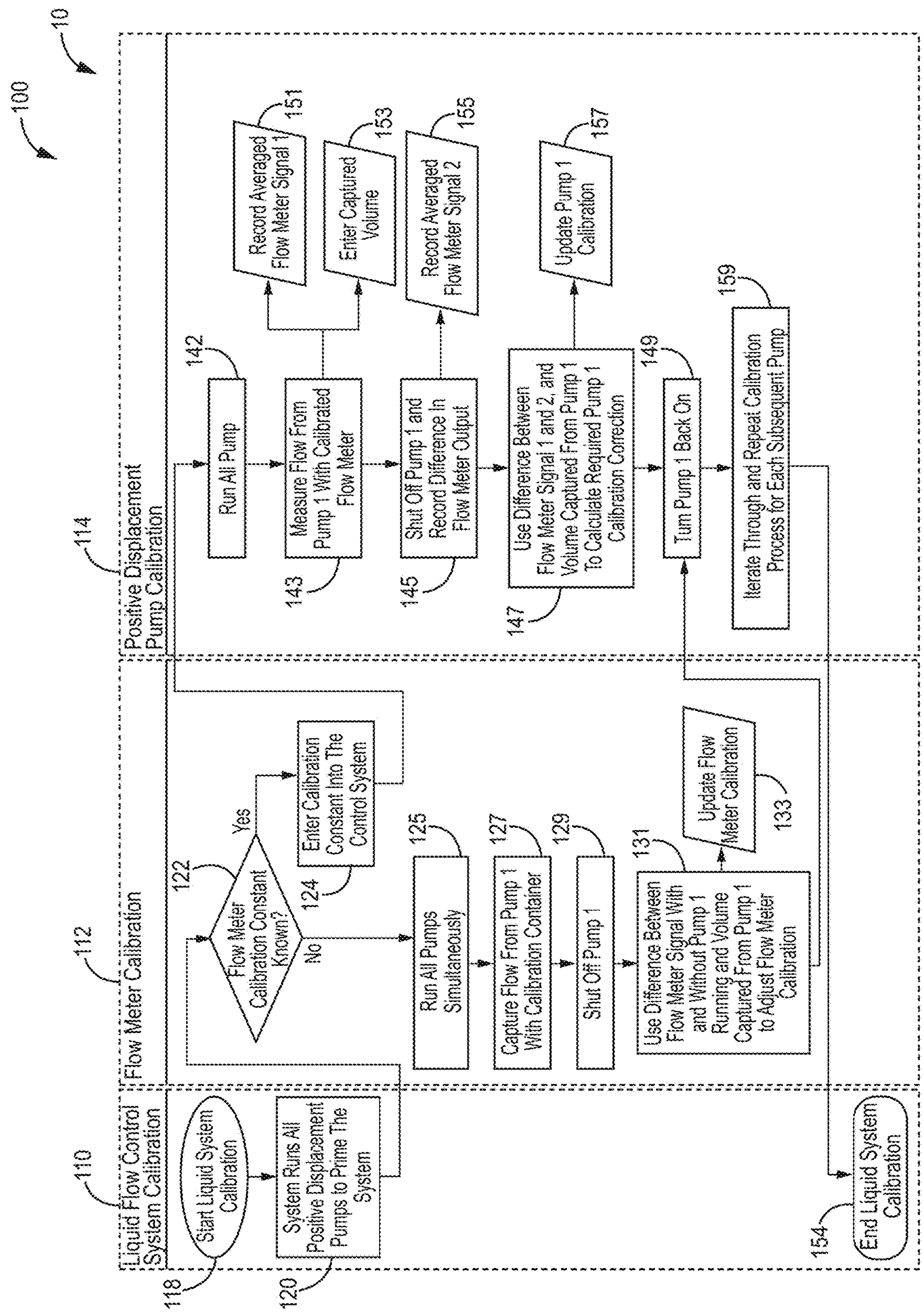
FIG. 18 is a flow chart showing the calibration system, according to one implementation.

Turning to FIGS. 17 and 18, the system 10 may be calibrated via several approaches in various implementations. System calibration may be performed semi-automatically, as is shown in the system 10 of FIG. 17, which has a calibrator 100. In these implementations, it is understood that the flow meter 12 is able to measure the volume of a single pump 16.

By way of example, the system 10 may need to be calibrated for proper application of products having varying physical properties such as density and viscosity. System calibration and monitoring may also alert a user to pump 16 wear and/or damage that could affect product application, reducing down-time and repair cost. In various implementations, system calibration may be performed at the time of initial system installation, as well as at the beginning of a season, and/or at any other time as desired.

Continuing with the implementation of FIG. 17, the calibrator 100 consists of various optional steps that can be performed in any order. The system 10 may perform calibration of the flow control system (box 110), the flow meter (box 112), and/or the positive displacement pump(s) (box 114). The calibrator 100 may also be able to identify, diagnose and repair pumps (box 116).

In some implementations, the calibrator 100 is started (box 118) then the system 10 runs to prime all of the pumps 16 (box 120). Once the system 10 is primed the flow meter 12 may be calibrated (box 112).

The calibrator 100 identifies or asks a user if the calibration constant is known (box 122). If the calibration constant is known the system 10 or user can input the calibration constant into the calibrator 100 (box 124). If the calibration constant is unknown, the system 10 may execute a series of steps to determine the calibration constant.

To determine the calibration constant according to certain implementations, the system 10 dispenses a volume of liquid/product into a container from a single displacement pump 16 while the calibrator 100 monitors and accumulates flow meter 12 feedback (box 126). A user, the system 10, or calibrator 100 may measure the amount/volume of liquid/product that was dispensed (box 128). The amount dispensed may then be entered into the calibrator 100 (box 130). The calibrator 100 then determines the calibration constant from the amount dispensed and flow meter 12 feedback (box 140).

The positive displacement pumps 16 can also be calibrated (box 114) by running a first pump 16 (box 142). The electronic signature for the first pump 16 is stored (box 146). The calibrator 100 continues to run the pumps 16 one at a time (box 144) recording each pump's 16 electronic signature (box 146) until the last pump 16 has been run and signature recorded. It is understood that in various implementations, the electronic signature can comprise at least one of motor voltage, motor current and/or speed, as well as other readings or signatures understood by those of skill in the art. In one exemplary implementation, once the last pump 16 is recorded (box 148), the calibrator determines if each pump 16 has exhibited the proper characteristics (box 150). If every pump 16 has exhibited the proper characteristics then the calibration can end (box 154). If every pump 16 has not exhibited the proper characteristics the malfunctioning pump 16 or pumps 16 must be identified, diagnosed and repaired (box 116). Other approaches are of course possible, as would be understood by those of skill in the art.

The calibrator can identify any pump 16 that is not exhibiting defined characteristics or performing within thresholds (box 156). A user may then decide if the pump 16 needs to be repaired (box 158). If repair is not chosen the calibration ends (box 154). If the pump 16 is repaired (box 160) then the positive displacement pump 16 calibration (box 114), as described above, can be re-run to determine if the repaired pump 16 is now exhibiting the proper defined characteristics and/or performing within thresholds.

In certain implementations, such as that shown in FIG. 18, the flow meter 12 need not be able to measure the volume of a single pump 16. In these implementations, the calibrator 100 is started (box 118) and the system 10 runs all of the displacement pumps to prime the system (box 120). Once the system is primed, the calibrator 100 identifies or asks if the flow meter calibration constant is known (box 122). If the calibration constant is known that value is entered into the calibrator (box 124).

In implementations where the calibration constant is unknown, the calibrator 100 may determine or otherwise establish the calibration constant (boxes 125, 127, 129, 131 and 133). In implementations wherein the flow meter 12 is not sufficiently sensitive to measure the volume of a single pump, the calibrator 100 may run all pumps simultaneously (box 125) to determine the calibration constant. The discharge/product of one of the pumps is collected in a calibrated container (box 127). The pump from which the discharge/product was collected is then shut off (box 129).

In one such exemplary implementation, the calibrator 100 runs all pumps except the one from which the discharge/product was collected, and compares the pre-shut off flow meter signal with the signal after a pump is shut off (box 131). The calibration constant can then be established and entered into the calibrator (box 133). In these implementations, the process of shutting off the pumps individually and in sequence while comparing the flow meter signal changes between when any individual pump is shut off and with the signal when all pumps are running is repeated until all of the pumps have been tested (boxes 149, 159). Once all of the pumps have been tested/calibrated the calibration according to these implementations ends (box 154). Other calibration methods and systems can be applied in alternate implementations.

Continuing with the implementation of FIG. 18, when at least one calibration constant is known (boxes 122, 124) the positive displacement pump calibration (box 114) begins by running all pumps (box 142). The calibrator 100, system 10 or user captures the discharge/product from one of the flow meters (box 143). The calibrator 100 records the average flow meter signal (box 151) and the amount of discharge/product captured is entered into the calibrator 100 (box 153) for use in calibration.

The calibrator 100 according to these implementations continues to calibrate each individual pump by shutting off one of the pumps (box 145) and measuring and recording the difference in flow meter output (box 155). The calibrator 100 uses the recorded difference between flow meter output and volume of product captured to calibrate the pump that was turned off (box 147). The pump is then calibrated and entered into the calibrator and stored (box 157).

The steps above can be repeated, shutting off one pump at a time, until each pump has been calibrated (boxes 149, 159). After each pump has been calibrated or at the desired time the calibration can end (box 154).

The calibration processes of FIG. 17 and FIG. 18 may begin or be resumed and run only for repaired pumps, as would be appreciated by those of skill in the art, in light of the above disclosure. The calibration processes may also be paused at any desired time to allow for repairs to be made. Further implementations are possible.

When a new product is used in the system 10, a prior calibration can be used as a baseline for the calibration of the new product. The system 10 and/or calibrator 100 can monitor flow meter feedback with the new product over one or more intervals to store calibration specific to each product.

The above described calibration processes for use with the system 10 allow for the system 10 to be calibrated using water or any other appropriate substance. The use of water or other substance for the calibration results in less mess and avoids wasted product. Additionally, user effort is minimized with the semi-automated system of FIG. 17 with users only having to capture and measure amounts of discharge/product from one row of the system 10.

The system 10 and calibrator 100 can be implemented with various computers, hardware such as via a processor or PLC, firmware and/or software to automatically derive calibration values and store the values for the user, for example in storage memory or in a database, as would be readily appreciated. The system 10 and calibrator 100 may also be used in conjunction with machine learning to fine tune calibration of different products without any or only minimal effort and/or interaction from a user.

In certain implementations, the calibration system 100 can identify failed pumps 16 while also identifying pumps 16 that are still functioning but not functioning optimally and/or properly. Identification of malfunctioning pumps 16 allows for repair prior to use of the system 10, thereby preventing in-field failures.

In the implementations of FIGS. 17-18, after calibration is complete (box 154), the system 10 utilizes the calibration information to control product application rates and monitor flow control components. The system 10 may be able to identify pump assembly wear, pump assembly failure, fluidic system restrictions, fluidic system leaks, as well as other failures or malfunctions as would be appreciated.

Although the disclosure has been described with reference to preferred implementations, persons skilled in the art will recognize that changes may be made in form and detail without departing from the spirit and scope of the disclosed apparatus, systems and methods.

What is claimed is:

1. A liquid distribution system for an agricultural implement comprising:

(a) a supply tank;

(b) a fluid distribution manifold extending along the length of an agricultural toolbar in fluidic communication with the supply tank;

(c) a plurality of first pumps, one of the plurality of first pumps in fluidic communication with the fluid distribution manifold;

(d) a plurality of switching valves, each of the plurality of switching valves in communication with one of the plurality of first pumps; and (e) one or more bypass lines, each of the one or more bypass lines comprising a second pump configured to direct fluid about one of the plurality of first pumps, wherein the liquid distribution system is configured for individual control of the plurality of first pumps and second pump.

2. The liquid distribution system of claim 1, wherein the plurality of first pumps are variable speed positive displacement pumps.

3. The liquid distribution system of claim 1, wherein the second pump is a bi-directional pump.

4. The liquid distribution system of claim 1, further comprising a plurality of discharges, each of the plurality of discharges in fluidic communication with one of the switching valves.

5. The liquid distribution system of claim 4, further comprising a plurality of flow meters, each of the plurality of flow meters in fluidic communication with one of the plurality of first pumps.

6. The liquid distribution system of claim 1, further comprising determining an electronic signature of each of the plurality of first pumps, the electronic signature configured to establish volumetric flow from one or more pump characteristics.

7. The liquid distribution system of claim 6, wherein the one or more pump characteristics are selected from current applied to a pump motor, voltage applied to the pump motor, displacement, volumetric efficiency, and pump rotational speed.

8. A liquid application system comprising:

(a) a fluid distribution manifold extending along an agricultural toolbar; and (b) a plurality of row units along the agricultural toolbar, each of the plurality of row units comprising:

(i) a first positive displacement pump in fluidic communication with the fluid distribution manifold;

(ii) a discharge in fluidic communication with the first positive displacement pump;

(iii) a bypass line configured to direct fluid around the first positive displacement pump; and (iv) a second positive displacement pump in fluidic communication with the bypass line, wherein use of the first positive displacement pump and second positive displacement pump are selected based on an output flow requirement.

9. The liquid application system of claim 8, further comprising a switching valve in communication with the first positive displacement pump.

10. The liquid application system of claim 9, wherein the switching valve is a high speed 3-way valve.

11. The liquid application system of claim 8, wherein the system is configured to utilize an electronic signature to establish volumetric flow of the first positive displacement pump via an open loop system.

12. The liquid application system of claim 8, wherein the second positive displacement pump is a bi-directional pump.

13. The liquid application system of claim 12, wherein the system is configured to actuate the second positive displacement pump to reduce flow below a minimum flow of the first positive displacement pump or extend a flow range of the first positive displacement pump.

14. A system for liquid distribution on an agricultural implement, comprising:

(i) a first positive displacement pump;

(ii) a switching valve in fluidic communication with the first positive displacement pump;

(iii) a discharge in fluidic communication with the switching valve;

(iv) a return line in fluidic communication with the switching valve configured to return liquid to a manifold; and (v) a bypass line comprising a second positive displacement pump configured to direct fluid about the first positive displacement pump, wherein the system is configured to utilize an electronic signature to establish volumetric flow of the first positive displacement pump via an open loop system, and wherein the system is configured to actuate the second positive displacement pump to reduce flow below a minimum flow of the first positive displacement pump or extend a flow range of the first positive displacement pump.

15. The system of claim 14, further comprising a flow meter in communication with the first positive displacement pump and the switching valve.

16. The system of claim 14, wherein the switching valve is a high speed 3-way valve.

17. The system of claim 14, wherein the second positive displacement pump is a bi- directional pump.

18. The system of claim 17, wherein the maximum output of the second positive displacement pump is greater than or equal to the minimum output of the first positive displacement pump.

19. The system of claim 18, wherein the total output of the first positive displacement pump and the second positive displacement pump is greater than a total system output requirement.

20. The system of claim 14, wherein the system selectively actuates the first positive displacement pump and the second positive displacement pump to achieve a desired output flow.

* * * * *